United States Patent [19]

Hage

[11] 4,042,752

[45] * Aug. 16, 1977

[54] MULTIPLE METALLIC LAYERS INCLUDING TIN-COBALT CONTAINING ALLOY LAYER, WITH PLASTIC SUBSTRATE

[75] Inventor: Jacob M. Hage, Farmington, Mich.

[73] Assignee: M.C.P. Industries, Inc., Troy, Mich.

[*] Notice: The portion of the term of this patent subsequent to Dec. 16, 1992, has been disclaimed.

[21] Appl. No.: 640,713

[22] Filed: Dec. 15, 1975

Related U.S. Application Data

[60] Continuation-in-part of Ser. No. 432,862, Jan. 14, 1974, Pat. No. 3,926,569, which is a division of Ser. No. 249,850, May 3, 1972, Pat. No. 3,884,116, which is a continuation-in-part of Ser. No. 208,080, Dec. 15, 1971, abandoned.

[51] Int. Cl.² .............................................. B32B 15/08
[52] U.S. Cl. .................................................... 428/626
[58] Field of Search ...................................... 29/195 P

[56] References Cited

U.S. PATENT DOCUMENTS

| | | | |
|---|---|---|---|
| 3,481,840 | 12/1969 | Lupinski et al. | 29/195 |
| 3,527,579 | 9/1970 | Cines | 29/195 |
| 3,558,290 | 1/1971 | Baier et al. | 29/195 |
| 3,771,977 | 11/1973 | Liu | 29/195 |
| 3,868,229 | 2/1975 | Hurley | 29/195 |
| 3,926,569 | 12/1975 | Hage | 29/194 |
| 3,930,807 | 1/1976 | Kobayashi et al. | 29/195 |

*Primary Examiner* — L. Dewayne Rutledge
*Assistant Examiner* — E. L. Weise
*Attorney, Agent, or Firm* — Harness, Dickey & Pierce

[57] ABSTRACT

A novel product means of a corrosion resistant nature, and having a plastic substrate, and presenting a shiny or lustrous, or satin-like outer appearance.

18 Claims, 3 Drawing Figures

MULTIPLE METALLIC LAYERS INCLUDING TIN-COBALT CONTAINING ALLOY LAYER, WITH PLASTIC SUBSTRATE

CROSS REFERENCE TO RELATED APPLICATIONS

This application is a continuation-in-part of copending application Ser. No. 432,862 filed Jan. 14, 1974, now U.S. Pat. No. 3,926,569, dated Dec. 16, 1975, which application is in turn a divisional application of application Ser. No. 249,850, filed May 3, 1972, now U.S. Pat. No. 3,834,116, dated May 20, 1975, which latter application is in turn a continuation-in-part of application Ser. No. 208,080, filed Dec. 15, 1971, now abandoned. The disclosures and references cited in said application are hereby incorporated herein by reference.

BACKGROUND OF THE INVENTION

This invention broadly relates to a novel corrosion resistant product with a plurality of metallic layers thereon. More specifically, this invention relates to a novel product which possesses good resistance to corrosion and which presents a shiny outer appearance, or a lustrous outer appearance, or a satin-like outer appearance.

The state of the art is indicated by the following references which are cited here for the record: U.S. Pat. Nos. 3,141,836, Seyb et al.; 3,268,307 Tomaszewski et al.; 3,282,810 Marie; 3,298,802 Marie; 3,445,351 Swalheim et al.; 3,573,008 Akin; 3,532,609 Miyata et al.; 2,603,593 Blickensderfer; 3,501,278 Uchida et al.; 3,503,775 Austin; 1,878,837 Francis; 1,903,130 Phillips; 2,676,917 Hammond et al.; 2,709,847 Ihrie et al.; 2,855,348 Topelian; 2,856,333 Topelian; 2,950,234 Johnson et al.; 3,317,411 Letendre; 2,824,830 Hausner; 3,414,488 Willingham; 3,428,441 Du Rose et al.; 3,485,654 McGraw et al.; 3,498,892 Seyb et al.; 3,513,810 Jackson; McGraw Hill Encyclopedia of Science and Technology, Vol. 8, 1960, Page 280; "Electroplating" by J. B. Mohler et al.; published 1951 by Chemical Publishing Co., Inc., Chapter 20 on Diffusion Coatings; Fisher Body Material Specification, No. 1–36, dated Aug. 5, 1971; and, Ford Motor Company Engineering Specification, entitled "Chromium Plated Carbon Steel Fasteners," dated May 25, 1970. The disclosures of the above references which indicate the state of the art are hereby incorporated herein by reference.

A main object of this invention is to provide a particularly economical and new product means which possesses good resistance to corrosion and which has an outer shiny appearance, or lustrous appearance, or satin-like appearance.

Another object of this invention is to provide a new and improved product for use in the automatic field or for like uses in other fields.

Another object is to provide a new and economical corrosion resistant product which has an outer shiny appearance, or lustrous appearance, or satin-like appearance, without the use of a chromium layer.

Other objects, features and advantages of the present invention will become apparent from the subsequent description and the appended claims taken in conjunction with the accompanying drawings.

SUMMARY OF THE INVENTION

It is not fully understood why the invention provides the advantages or excellent results which have been obtained, and it is not intended to base the invention on any particular theory of operation, yet it is believed that the new product discovered and disclosed herein derives its unexpected benefits or advantages from special layer material means which are constructed on or applied on the basis metal of the fastener or product substrate. A fastener constructed in accordance with the invention is particularly economical to produce, and yet possesses good corrosion resistance properties while at the same time presenting an outer shiny or lustrous or satin-like appearance. The invention is still being studied to obtain a better understanding of the operative causes which underlie the discovery. The invention is believed to be of wide applicability to fasteners and like products.

As background to this invention, one of the original uses of chromium was as a very thin layer on decorative parts because the chromium is very tarnish resistant and retains its bright appearance. It was subsequently discovered that under certain conditions thin chromium layer means, deposited over nickel plated parts, significantly enhanced the basis metal protection against corrosion. An explanation of this phenomena can be made using electrode potentials and the distribution of corrosion currents between multiple metallic layer means. This has led to applications of multiple nickel deposits, micro-cracked, and micro-porous chromium deposits, etc., to give increased corrosion protection. However chromium in some instances is difficult to apply for various reasons such as low throwing power or intermittent contact, etc. and this is particularly true in bulk chromium finishing of fasteners.

In one inventive aspect it has now been found that extremely thin deposits of tin-cobalt alloys or tin-nickel alloys or like alloy materials over a nickel layer appears to very significantly enhance the corrosion protection of the basis metal similar to thin chromium deposits. This result is not completely understood at present and is still being studied.

In addition it is considered that because of ecological and economical reasons the discovery referred to above is of significant potential in industry. Also, in numerous instances, small parts are uniquely difficult to chromium plate in bulk whereas the invention discovered and disclosed herein provides a substitute process which is not difficult to carry out because the small parts such as fasteners may be kept in a plating cylinder or barrel plating apparatus and then transmitted directly into a plating bath as disclosed herein for the amount of time necessary to effect the preparation of the product as discovered herein.

In one aspect, briefly stated, the present invention comprises a plated product means for use in exterior as well as interior applications, such as in the automotive field and the like, and operative to provide good corrosion resistance properties, and being of a satin-like or shiny appearance, and which product is made using a plastic substrate material.

In another aspect, briefly stated, the present invention concerns a corrosion resistant plated metal fastener means for fastening objects in exterior as well as interior applications, such as in the automotive field and the like, and operative to provide good corrosion resistance properties, and being of satin-like or shiny appearance, comprising: a head portion at one of the fastener means, and a shank portion, said fastener means having structural makeup of separate layer including, (a) structural base metal means, (b) layer means of metal selected from at least one of the group consisting of copper, cobalt, nickel, tin, cadmium and zinc having a thickness between about 0.00001 and about 0.0001 inches, (c) layer means of metal selected from at least one of the group consisting of cadmium, zinc, tin, cadmium-tin alloys, cadmium-zinc alloys, zinc-copper alloys, cadmium copper alloys, and zinc-tin alloys, having a thickness between about 0.00005 and about 0.0009 inches, (d) layer means of copper having a thickness between about 0.00001 and about 0.0005 inches, (e) layer means of metal selected from at least one of the group consisting of nickel, cobalt, and nickel-cobalt alloys, having a thickness between about 0.0001 and about 0.0007 inches, (f) layer means of at least one material selected from the group consisting of a tin/nickel alloy, a tin/cobalt-nickel alloy, or a tin/cobalt alloy, said layer means having a thickness between about 0.000005 and about 0.00020 inches, said layer means being for the most part applied by electrolytic coating process and being operative to enable good corrosion resistance properties and good adhesion properties.

In another aspect, briefly stated, the present invention comprises a means for fastening various objects and for like uses, said means having a structural makeup of layers including, (a) structural base metal means, (b) layer means of metal selected from at least one of the group consisting of copper, cobalt, nickel, tin, cadmium and zinc having a thickness between about 0.00001 and about 0.0001 inches, (c) layer means of metal selected from at least one of the group consisting of cadmium, zinc, tin, cadmium-tin alloys, cadmium-zinc alloys, zinc-copper alloys, cadmium-copper alloys, and zinc-tin alloys, having a thickness between about 0.00005 and about 0.0009 inches, (d) layer means of copper having a thickness between about 0.00001 and about 0.0005 inches, (e) layer means of metal selected from at least one of the group consisting of nickel, cobalt, and nickel-cobalt alloys, having a thickness between about 0.0001 and about 0.0007 inches, (f) layer means of at least one material selected from the group consisting of a tin/nickel alloy, a tin/cobalt-nickel alloy, or a tin/cobalt alloy, said layer means having a thickness between about 0.000005 and about 0.00020 inches, said layer means being for the most part applied by electrolytic coating process and being operative to enable good corrosion resistance properties and good adhesion properties.

The invention also concerns a fastener means which includes self tapping means at one end of the fastener for drilling a receptive aperture for the fastener. The fastener herein, in preferred embodiments, is either threaded or contains annular grooves.

In still another aspect, the present invention comprises a plated product means for use in interior as well as exterior applications such as in the automotive field and the like, and operative to provide good corrosion resistance properties, and being of satin-like lustrous or shiny appearance, comprising: a structural makeup of separate layers including, (a) a plastic substrate member, (b) zero up to about 0.0005 inches thickness of a layer means of copper or a copper alloy, (c) layer means selected from at least one material of the group consisting of nickel, cobalt, and nickel-cobalt alloys having a thickness between about 0.0001 and about 0.001 inches, (d) layer means of at least one material selected from the group consisting of a tin/cobalt-nickel alloy, or a tin/cobalt alloy, said layer means having a thickness between about 0.000005 and about 0.00020 inches, said layer means being for the most part applied by electrolytic coating process and being operative to enable good corrosion resistance properties and good adhesion properties. It will also be appreciated and understood that where a particular metal is disclosed for use as one of the layers herein, that also it is possible to use an alloy of that metal as well.

A particularly unique feature discovered in accordance with the invention herein is that the product means constructed as described above if contacted with an aqueous, acidic solution means containing chromic acid, chromate, and/or dichromate materials in solution renders the fastener construction such that it is operative to retain a shiny or lustrous or satin-like outer appearance under significant corrosion resistance. This shiny appearance, etc., and resistance to corrosion is cumulative or additive to that described above in the various product constructions there disclosed.

Another unique feature discovered in accordance with the invention herein is that very fine particulate insoluble material means may be held in suspension in the Sn/Ni solution while electro-deposition is being carried on so that many of these fine particles are codeposited with the metal. Many types of insoluble particles are possible some of which may be $BaSO_4$, etc. By insoluble it is meant insoluble in the electrolytic coating bath used for electrolytic coating of the Sn/Ni alloy or the like. It has been discovered that under certain conditions this codeposition in the final layer will greatly enhance the basis metal protection from corrosion. This of course differs from previous use of codeposited fine particulate matter in that in this case the particulate matter is codeposited in the final layer. These insoluble particles may be selected from the group as follows: (1) insoluble inorganic materials, such as oxides, sulfates, ferrites and the like, (2) fine particulated plastic resins, and (3) fine particulated glass materials. Representative fine particles which may be used (and incorporated herein by reference) are disclosed in U.S. Pat. Nos. 3,356,467; 3,268,424; 3,268,423; 3,268,308; and 3,268,307. These fine particles should have a particle size of less than about 100 microns, and preferably less than about 50 microns average particle diameter. Good results are obtained within the range of about 0.001 to about 5 microns average particle diameter (sometimes referred to as particle size).

DESCRIPTION OF PREFERRED EMBODIMENTS

This description should be taken as illustrative only, and the deascription is made to describe the preferred embodiments of this invention.

Figure 1:
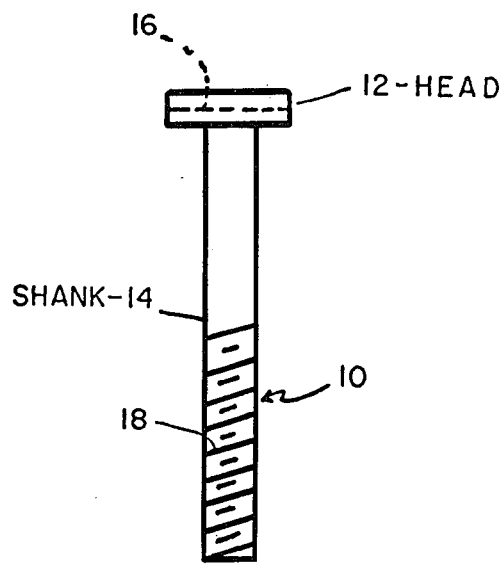
FIG. 1 illustrates one suitable fastener of a construction in accordance with the invention disclosed herein.

FIG. 1 illustrates a fastener means designated 10 in accordance with the invention. The fastener means is comprised of a head portion 12 and a shank portion 14. The head 12 may suitably contain means such as the slot 16 for insertion of any suitable drive means such as a magnetic screwdriver means or a normal screwdriver or the like.

The fastener means 10 may suitably include annular groove means or threads designated 18.

Figure 2:
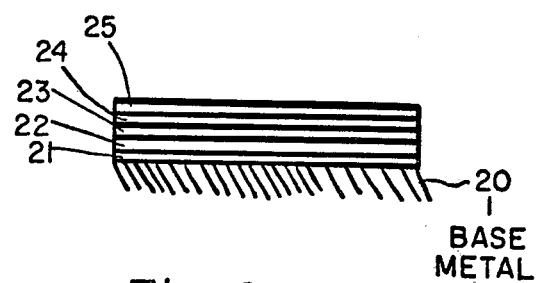
FIG. 2 illustrates an exploded view of a typical cross section of the surface construction of the fastener in FIG. 1 (with the cross section for example being taken on the fastener head midway between the recess and the edge of the head) showing the metal layer means structure of the fastener; and, FIG. 3, in partial cut-away form, illustrates another fastener embodiment in accordance with this invention wherein a self tapping end portion is included on the fastener.

FIG. 2 illustrates, in greatly enlarged detail, the structural makeup of the fastener means which has been discovered and disclosed herein. The makeup of the fastener means 10 includes a base member such as of plastic, steel, brass, titanium, aluminum, zinc, or stainless steel, and the like, designated 20 and the base metal of the fastener has structural layers formed thereover as follows. When the base member or substrate is a plastic material it is prepared for reception of the subsequent metal layers as follows. The plastic surface is first sensitized with an etching compound, then the plastic surface has an immersion deposit of a noble metal applied thereto (e.g., palladium, platinum, or the like) and, this followed by application of an electroless nickel layer. Subsequent to this preparation of the plastic substrate means the metal layers may be applied as described herein. A first layer means of a preferred metal such as copper having a thickness between about 0.00001 and about 0.0001 inches designated 21. A second layer means designated 22 for example preferably of cadmium and having a thickness between about 0.00005 and about 0.0009 inches. A third layer means designated 23 of a preferred material such as copper having a thickness between about 0.00001 and about 0.0005 inches. A fourth layer means designated 24 of a preferred material such as nickel having a thickness between about 0.0001 and about 0.0007 inches.

A fifth layer means designated 25 of a material selected from at least one of the group consisting of preferably a tin/nickel alloy, or a tin/cobalt-nickel alloy, or a tin/cobalt alloy, with the layer means 25 having a thickness between about 0.000005 and about 0.00020 inches.

In accordance with this invention all of said layer means referred to above are generally and for the most part applied by electrolytic coating process, except where otherwise noted.

On a preferred basis the fifth layer means (or the Sn/Ni, etc., layer) has a thickness between about 0.00001 and about 0.00015, and specifically good results are obtained when the fifth layer means has a thickness between about 0.00001 and about 0.00009 inches.

It is to be understood that the dimensions of the layer means 21-25 as shown in FIG. 2 are greatly exaggerated and that these layer means would actually be formed on the fastener means 10 in a uniform fashion such as would be compatible with the desired dimensions of the threads or annular groove means which are used on the fastener means 10.

It should also be noted as another aspect of the inventive discovery herein that the layer means 24 of nickel may be deposited directly over the base metal 20 or optionally the layer means 24 may be deposited over a copper layer means which is first deposited on the base metal 20 and then the product construction may be completed by formation of the layer means 25 directly over the layer means 24. In this aspect of the invention layer means 21 is only optionally present and layer means 22 and 23 are omitted.

Figure 3:
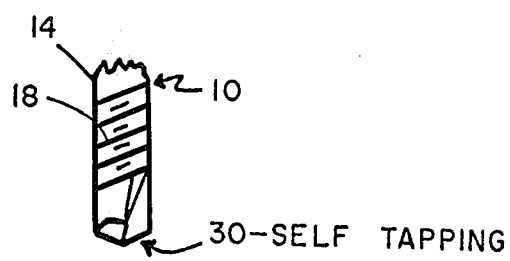

FIG. 3 illustrates a fastener means 10 similar to the fastener means of FIG. 1 except that in FIG. 3 the fastener means includes a self tapping means designated 30 at one end of the fastener means.

The head portion 12 of the fastener means 10 may use any suitable driving means for insertion of the fastener or for connection of the fastener such as a transverse slot or recess for a screwdriver or a Phillips type recess for driving by a Phillips type drive member, or other types of torquing, crimping, and/or connection means can be used with the fastener of this invention. A magnetic drive means for example may be used in the utilization of a self tapping screw or fastener means in accordance with this invention. Numerous other types of driving or installing means may be used with the fastener means 10 depending on the particular construction of the inventive fastener means herein which is utilized.

The first layer means of copper referred to hereinabove may also suitably be a metal selected from at least one of the group consisting of copper, nickel, tin, cadmium, cobalt, and zinc. The thickness of this layer means may be on a preferred basis within the range of about 0.00002 to about 0.00008 inches.

The second layer means of cadmium referred to hereinabove may also suitably be a metal selected from at least one of the group consisting of cadmium, zinc, tin, cadmium-tin alloys, cadmium-zinc alloys, zinc-copper alloys, zinc-tin alloys, and cadmium-copper alloys. On a preferred basis this layer means should have a thickness within the range of about 0.0001 to about 0.0005 inches.

The third layer means of copper or a copper alloy referred to hereinabove may preferably have a thickness within the range of about 0.00004 to about 0.00012 inches.

The fourth layer means of nickel referred to above may preferably have a thickness within the range of about 0.0003 to about 0.0005 inches.

It is also part of the discovery in accordance with this invention that the fastener means may be subjected to heating, such as baking and the like at a temperature between about 250° F and about 900° F for a time duration of about 1/12 to about 8 hours and longer subsequent to application of the layer means (c) referred to above. This technique of subjecting to heating should be carried out preferably following the application of the layer means (c) or also it may be done subsequent to that time for example at the end of the application of the final coating layer means. This heating operation may be utilized to bring some additional advantages in the final corrosion resistance properties of the fastener means described herein, and it also assists in forming an even more tenaciously adherent coating layers means on the fastener.

On a preferred basis layer means (b) referred to above may be selected from at least one of the group consisting of copper and/or nickel. Layer means (c) may be, in certain preferred instances, selected from at least one of the group consisting of cadmium, tin, zinc, and alloys thereof. Best results in accordance with the discovery herein appear to be obtained when layer means (c) is selected from the group consisting of cadmium, tin, and alloys thereof.

While it has been discovered to be possible to apply the coating layer means referred to hereinabove in several different manners the best results to data appear to be obtained with the application of the layer means (b) for example of copper from a cyanide-copper electrolytic coating bath (and the effects of this layer may be optionally enhanced by a thin additional deposition of copper from an acid-copper plating bath). Layer means (c) appears to be best applied from a cyanide-cadmium electrolytic coating bath. Layer means (d) appears to be best applied from a cyanide-copper strike electrolytic coating bath followed by a more efficient copper plating bath such as an acid-copper plating bath, or a cyanide-copper plating bath. Layer means (e) appears to be best applied from a bright acid-nickel electrolytic coating bath.

Layer means (f) appears to be best applied from an acid electrolytic coating bath. As an example of a coating solution suitable for use in said bath, the following has been found to be highly suitable for use in this invention:

Stannous chloride ($SnCl_2$): 6.2 oz/gal.
Nickel chloride ($NiCl_2:6H_2O$): 39.0 oz.gal.
Ammonium bifluoride ($NH_4HF_2$): 7.5 oz./gal.
Ammonium hydroxide to pH of: 2.5 oz./gal.

The operating temperature of said bath should be approximately 150° F plus or minus 5°. The current density range used in said bath should be preferably 15–20 amps per square foot and broadly the current density should be maintained in the range of bout 5 to about 25 amps per square foot. The time in the plating bath may be broadly varied dependent on the current density range which is used, however, broadly the time in the plating bath should be within the range of about 2 minutes to about 60 minutes and preferably the plating of layer means (f) is accomplished within about 3 minutes to about 10 minutes residence time in the bath. Other suitable tin-nickel alloy coatings may be formed using the bath formulations described in U.S. Pat. No. 3,141,836, which disclosure is incorporated herein by reference.

Another preferred bath for application of layers means (f) is as follows:

Cobalt-tin type bath

Stannous cloride ($SnCl_2$): 6.0 oz/gal.
Cobalt Chloride ($CoCl_2:6H_2O$): 50.0 oz/gal.
Ammonium bifluoride ($NH_4HF_2$): 11.0 oz/gal.
Ammonium chloride ($NH_4Cl$): 5.0 oz/gal.

Deposits from this bath look more like chrome than ever the nickel-tin type.

Typical electrolytic baths which may satisfactorily be used for applying the layer means referred to above are as follows:

For layer means (b) of copper a cyanide-copper bath may be used of:
copper (as metal): 2 ozs. per gallon
sodium cyanide (free): 1 oz. per gallon
sodium hydroxide: 1 oz. per gallon
balance: water
temperature: 120° F
cathode current density (average): 25 amps per square foot
barrel plating residence time: 5–10 minutes For a layer means of cadmium, the bath may be a cadmium electrolytic coating bath as follows:
cadmium (as metal): 2.7 ozs. per gallon
sodium cyanide (total): 13.3 ozs. per gallon
sodium hydroxide: 1.9 ozs. per gallon
balance: water
temperature: 75–85° F
cathode current density: 30 amps per square foot
barrel plating residence time: approximately 30 minutes For the application of layer means (d) of copper having a fairly high thickness, a cyanide-copper strike bath as above is utilized for 5–10 minutes followed by a more efficient acid or cyanide-copper plating bath for 5–15 minutes.

For the application of layer means of nickel, an electrolytic coating bath may be used as follows:
hydrated nickel sulfate: 40 ozs. per gallon
hydrated nickel chloride: 8 ozs. per gallon
boric acid: 6 ozs. per gallon
brighteners:
McGean No. 230: 1 pint per 100 gallons
McGean No. 233: 4 gallons per 100 gallons
balance: water
pH: 4.0
temperature: 145° F
average current density: 45 amps per square foot
barrel plating residence time: 1½ hours It should be understood that the above coating baths used to form the construction of the fastener means referred to herein are only typical baths and that other baths may be used. It should be understood that in certain instances various of the layer means which are referred to herein may be applied by electroless coating techniques.

In accordance with the invention described herein it is preferred and best results appear to be obtained when the layer means (b), (c), (d), (e), or (f) as referred to above are formed by electrolytic coating process, however, it is also to be included as an aspect of this invention that these various layer means may also be formed by other coating techniques.

The advantages of this invention should be fairly apparent from the disclosure set forth above. However, it should also be clearly apparent that the fastener means discovered and disclosed herein is highly advantageous and believed to be commercially significant for the reason that the fastener means described herein possesses good corrosion resistance properties and good adhesion properties between the various layer means and the underlying base metal of the fastener. The layer means construction of the new fastener means discovered herein results in a fastener means which has a substrate with overlying layer means applied thereto which are strongly adherent to the fastener mean such that the fastener means is highly useful in various fastener applicatioons while at the same time the fastener means possesses good corrosion resistance properties making it very useful in commercial applications of numerous different types. It is believed that the fastener means discovered and disclosed herein is the first of its type and that it is particularly useful in the automotive . field, or marine field, or in the construction field. Also the fastener means discovered and disclosed herein is very economical to produce.

Still another advantage of the invention herein is that the use of the disclosed alloy coating as the final layer means of the fastener construction provides a final coating which is uniquely and satisfactorily applied to the fastener means because of the excellent throwing power, better efficiency and also much easier to do in bulk in a plating barrel than is chromium. It is to be understood that the thicknesses referred to herein are normally measured on the fastener head (e.g., midway between the slot or recess and the other edge of the head), however the thicknesses may also be measured on other suitable surfaces of the fastener means.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A product means for use in interior as well as exterior applications, such as in the automotive field and the like, and operative to provide good corrosion resistance properties, and being of satin-like lustrous or shiny appearance, comprising in sequence,
   a. a plastic substrate means for generally supporting the product means and being operative to receive and support a plurality of metallic layers thereon,
   b. zero up to about 0.0005 inches thickness of a layer means of a material selected from the group consisting of copper and copper alloys.
   c. layer means selected from at least one material of the group consisting of nickel, cobalt, and nickel-cobalt alloys, having a thickness between about 0.0001 and about 0.001 inches,
   d. layer means of at least one material selected from the group consisting of a tin/nickel alloy, a tin/cobalt-nickel alloy, or a tin/cobalt alloy, said layer means having a thickness between about 0.000005 and about 0.00020 inches,
   said layer means being for the most part applied by electrolytic coating process and being operative to enable good corrosion resistance properties and good adhesion properties.

2. The invention of claim 1 wherein, said layer means (b) has a thickness of at least about 0.00002 inches.

3. The invention of claim 2 wherein, said layer means (d) is a tin/cobalt alloy.

4. The invention of claim 1 wherein, said product means is contacted with an acidic aqueous solution means containing chromic acid, chromate and/or dichromate materials in solution and being operative to further assist said product means in retaining a shiny or lustrous appearance under sifnificant corrosion conditions.

5. The invention of claim 4 wherein, said layer means (b) has a thickness of at least about 0.00002 inches.

6. The invention of claim 3 wherein, said product means is contacted with an acidic aqueous solution means containing chromic acid, chromate and/or dichromate materials in solution and being operative to further assist and said fastener means in retaining a shiny or lustrous appearance under significant corrosion conditions.

7. A product means for corrosion resistant uses and operative to provide good corrosion resistance properties, and being of satin-like lustrous or shiny appearance, said product means having a structural makeup of separate layers in sequence including,
   a. structural plastic base member means for generally supporting the product means,
   b. zero up to about 0.0005 inches thickness of a layer means of a material selected from the group consisting of copper and copper alloys,
   c. layer means selected from at least one material of the group consisting of nickel, cobalt, and nickel-cobalt alloys,
   d. layer means of at least one material selected from the group consisting of a tin/cobalt-nickel alloy, or tin/cobalt alloy,
   said layer means being for the most part applied by electrolytic coating process and being operative to enable good corrosion resistance properties and good adhesion properties.

8. The invention of claim 7 wherein, said layer means (b) has a thickness of at least about 0.00002 inches.

9. The invention of claim 7 wherein, said product means is contacted with an aqueous solution means containing chromate and/or dichromate materials in solution and being operative to further assist said product means in retaining a shiny or lustrous appearance under significant corrosion conditions.

10. The invention of claim 8 wherein, said layer means (d) is a cobalt/tin alloy.

11. A product means for corrosion resistant uses and operative to provide good corrosion resistance properties and being of satin-like lustrous or shiny appearance, said product means having a structural makeup of separate layers in sequence including,
   a. a plastic base member for generally supporting the product means,
   b. zero up to about 0.0005 inches thickness of a layer means substantially of copper,
   c. layer means selected from at least one material of the group consisting of nickel, cobalt, and nickel-cobalt alloys,
   d. layer means of at least one material selected from the group consisting of a tin/cobalt-nickel alloy, or a tin/cobalt alloy,
   said layer means being for the most part applied by electrolytic coating process and being operative to enable good corrosion resistance properties and good adhesion properties.

12. The invention of claim 11 wherein, said layer means (d) is a tin-cobalt alloy or a tin-cobalt-nickel alloy.

13. The invention of claim 12 wherein, said layer means (b) has a thickness of at least about 0.00002 inches.

14. The invention of claim 13 wherein, said layer means (d) is applied from a bath containing, stannous chloride, and cobalt chloride.

15. The invention of claim 7 wherein, said layer means (d) is applied from a bath containing, stannous chloride, and cobalt chloride.

16. The invention of claim 7 wherein, said layer means (d) is a cobalt/tin alloy.

17. The invention of claim 13 wherein, said layer means (d) is a cobalt/tin alloy.

18. The invention of claim 7 wherein, said layer means (d) is a tin-cobalt alloy or a tin-cobalt-nickel alloy.

* * * * *

UNITED STATES PATENT AND TRADEMARK OFFICE
CERTIFICATE OF CORRECTION

PATENT NO. : 4,042,752
DATED : August 16, 1977
INVENTOR(S) : Jacob M. Hage

It is certified that error appears in the above-identified patent and that said Letters Patent are hereby corrected as shown below:

Column 4, line 65, the word "deascription" should read as -- description --;
Column 5, line 20, after the word "this" insert the word -- is --;
Column 6, line 48, after the word "bring" insert the word -- about --;
Column 6, line 64, the word "data" should read as -- date --;
Column 7, line 23, the word "bout" should read as --about--;
Column 8, line 47-48, the word "applicatioons" should read as -- applications --;
Column 8, line 66, the word "other" should read as -- outer --;
Column 9, line 45, the word "sifnificant" should read as -- significant --.

Signed and Sealed this

Twentieth Day of December 1977

[SEAL]

Attest:

RUTH C. MASON
Attesting Officer

LUTRELLE F. PARKER
Acting Commissioner of Patents and Trademarks